April 21, 1959   C. I. CLAUSING ET AL   2,883,022
DISENGAGEABLE SPRING CLUTCH
Filed Sept. 29, 1955   3 Sheets-Sheet 2
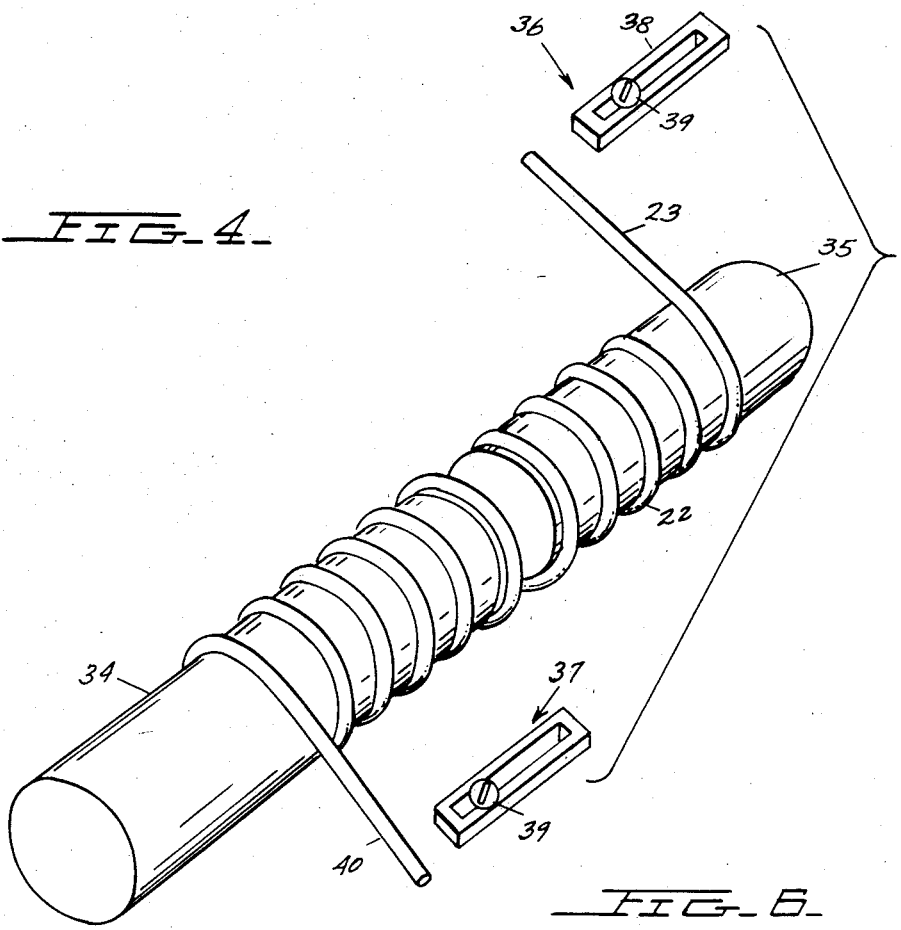
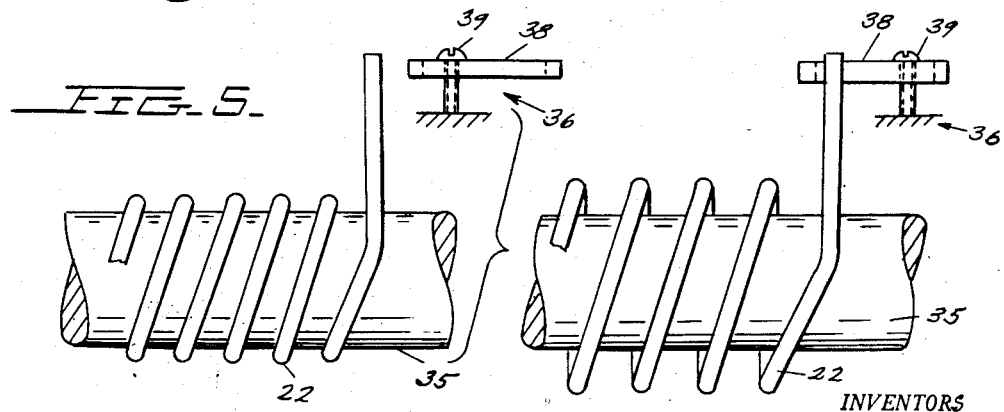
INVENTORS
C. I. CLAUSING
A. P. ROMANO
BY Ostrolenk, Faber,
Gerb & Soffen
ATTORNEYS

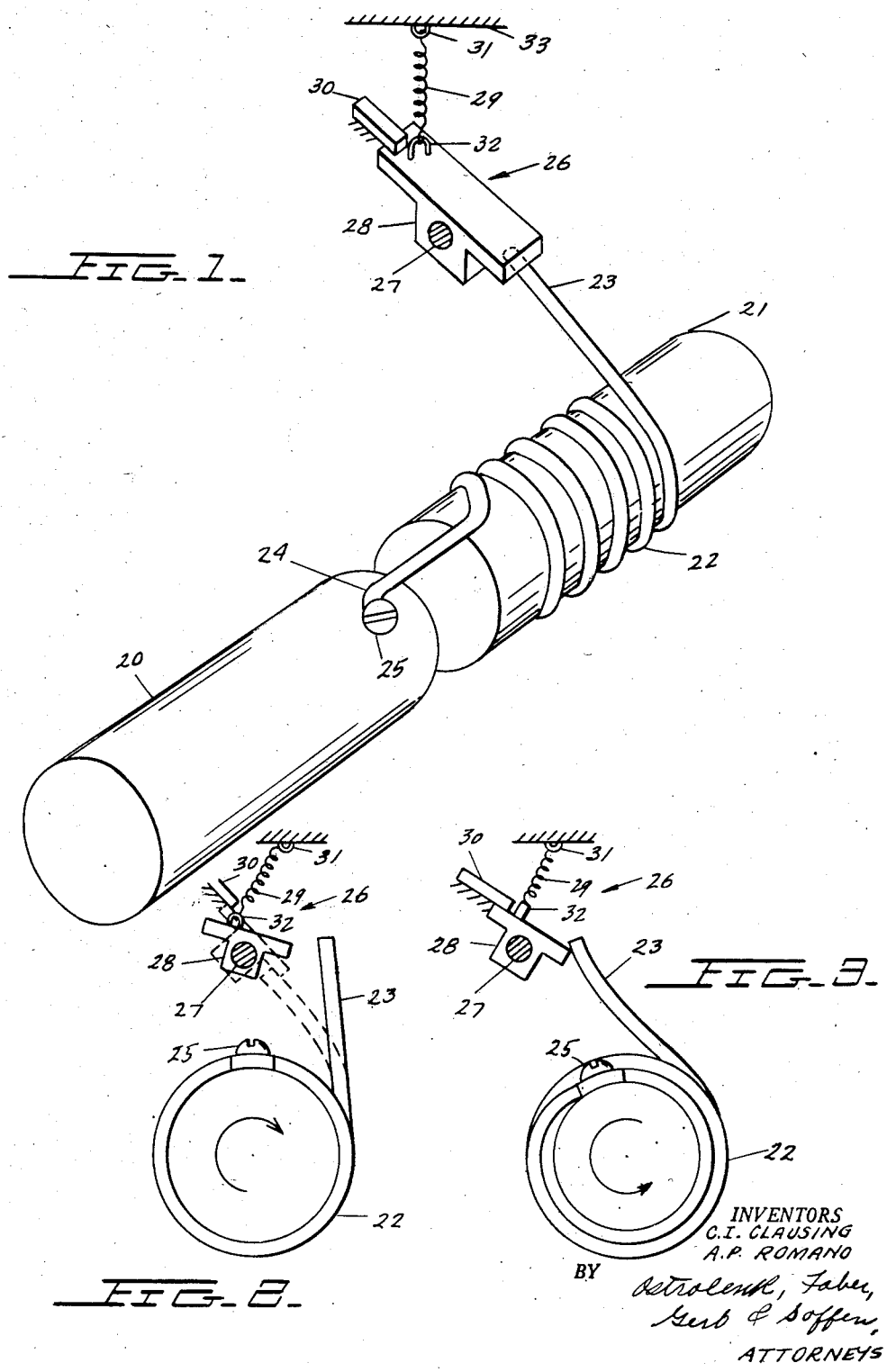

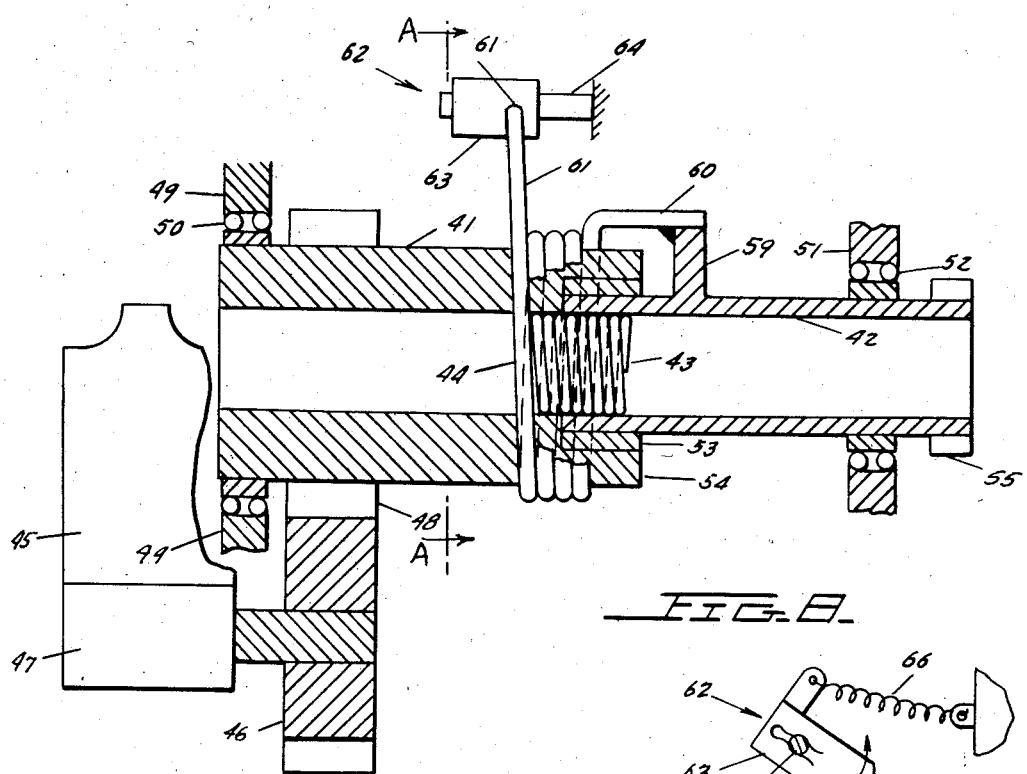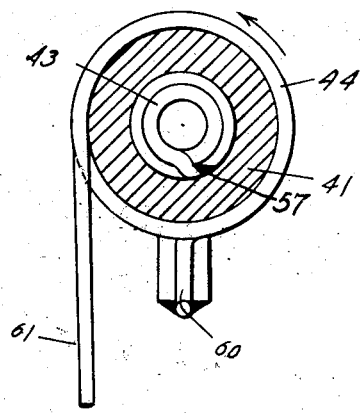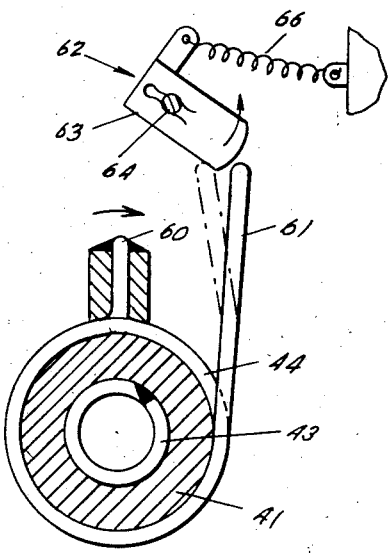

United States Patent Office 2,883,022
Patented Apr. 21, 1959

---

2,883,022

DISENGAGEABLE SPRING CLUTCH

Challiss I. Clausing, Westmont, N.J., and Anthony P. Romano, Philadelphia, Pa., assignors to I-T-E Circuit Breaker Company, Philadelphia, Pa., a corporation of Pennsylvania Application September 29, 1955, Serial No. 537,444

2 Claims. (Cl. 192—26)

Our invention relates to spring type clutches and more specifically to a spring clutch having disengageable features.

Spring clutches are well known devices whereby a first and second member which could be a coaxial drive shaft and driven shaft, respectively, are drivingly engaged by means of a spring connection whereby at least a portion of the spring is wound on one of the shafts and the other end of the spring is drivingly connected to the other shaft. In many cases, this driving connection between the spring and the second mentioned shaft merely comprises the remaining portion of the spring being wound on that shaft.

Hence, when the driving shaft is rotated in a first direction, the drag between the driving member and the driven member will be in the direction in which the spring is wound to thereby cause the inner diameter of the spring to contract if the spring is wound on the outer diameter of the members and to bring the spring in a tighter frictional engagement with the members.

Conversely, when the driving shaft is rotated in a second direction, the drag between the driving member and the driven member will be in a direction opposite to the direction in which the spring is wound to thereby tend to uncoil the spring, or increase its outer diameter. Obviously, the increase in the inner diameter of the spring will release the driving frictional connection between the spring and the shaft upon which it is wound.

It is, therefore, clear that spring clutches as presently used can transmit torque upon rotation of the driving shaft in one direction and are disengaged when this direction of rotation is reversed.

Our invention contemplates a spring clutch which can be disengaged during rotation of the driving member in the direction desired for driving the driven member. In principle, our invention is directed to the use of a spring for a spring clutch which is strong enough to effect driving of a driven shaft even when the rotational direction of the driving shaft is in a direction to unwind the spring. That is to say, that in driving the driven member, the load will not be sufficient to uncoil the clutch spring which is being stressed in a direction opposite to its wound direction.

In so doing, we can now construct the end of the spring which is being driven in its unwound direction to protrude from the periphery of the spring coils. If now it is desired to disengage the driving and driven member at any point, it is merely necessary to provide an engaging means which will engage the rotating protruding end of the spring thereby causing further rotation of the shaft containing the spring to impart high unwinding forces thereto.

Clearly, the driving connection which formerly existed between the spring and the member upon which it was wound will be disengaged since the load which is now placed upon the spring, in view of the engaging means which unwinds the spring, is substantially greater than the load which existed between the driving and the driven shafts.

Several extensions of our novel disengageable clutch are now obvious. That is, the engaging means previously described can be so constructed as to have a ratchet type of action whereby rotation of the driving shaft in the direction to wind the clutch spring will bring the protruding end portion of the spring into engagement with the engaging means where it is subsequently disengaged therefrom upon continued rotation.

However, rotation of the driving shaft in a direction to unwind the clutch spring will, when the end portion of the spring engages the engaging means, unwind the clutch spring since there is no possible disengagement between the protruding end of the spring and the ratchet type engaging means which will not flex the spring end when rotated in this direction.

Clearly, in the above type of construction, a relatively high load may be continuously driven in one direction whereas reversal of the direction of rotation will continue to act on the load for a predetermined amount of rotation within 360° whereupon the driving and driven shafts are automatically disconnected.

In the above mentioned clutch, the same spring was used for driving in a first and second direction of rotation. In a more specific embodiment, however, it is clear that a first spring clutch which is of the normal type can be provided for driving in a preferred direction whereas a spring clutch which is of the type of our invention can be utilized for attaching a driving and driven member for rotation in the opposite direction whereupon automatic disengagement is effected after a predetermined amount of rotation.

Clearly, however, the principle of the disengageable spring clutch feature as set forth herein has countless applications to clutching mechanisms only a few of which have been described above.

Accordingly, a primary object of our invention is to provide a spring clutch which is disengageable.

Another object of our invention is to provide a spring clutch wherein an end portion of the wound spring protrudes for engaging a relatively stationary member which will unwind the spring for disengagement between the spring and the member upon which it is wound.

Another object of our invention is to provide a spring clutch whereby at least a portion of the spring is wound on a first member, the end of this portion protruding beyond the periphery of the spring coils and the other end of the spring being fastened to a second member and to then provide an engaging means which is so constructed as to engage the protruding end of the spring upon a predetermined amount of rotation thereof.

A further object of our invention is to provide a spring clutch wherein a driving member and a driven member are operatively connected for rotation in one direction by means of a conventional spring clutch and are further connected for rotation in the reverse direction by means of our novel disconnectible spring clutch whereby torque transmission in this reverse direction may be disconnected at any predetermined time.

These and other objects of our invention will become apparent from the following description when taken in connection with the drawings in which:

Figure 1 shows a perspective view of a first and second member wherein a clutch spring constructed in accordance with our novel invention drivingly connects said first and second members.

Figure 2 is an end view of Figure 1 where rotation of the first and second members which are clutched together by our novel spring arrangement is in the direction in which the spring is wound.

Figure 3 is the same side view as shown in Figure 2 where rotation of the first and second members of Figure 1 is in a direction to cause engagement between the protruding end of the spring and the engaging means to thereby defeat the driving connection between the spring and the shaft upon which it is wound.

Figure 4 is similar to Figure 1 but shows the spring clutch as being wound on both said driving and driven members and the engaging means being selectively positioned for engagement of the protruding end of the spring.

Figure 5 shows a side view of the portion of Figure 4 which contains the protruding portion of the spring and its engaging means where the engaging means is remotely positioned from the protruding end of the spring to thereby allow driving in either direction of the drive shaft.

Figure 6 is similar to Figure 5 but the engaging means has been positioned to engage the protruding end portion of the spring and the spring is shown as being stressed to its unwound position to thereby allow disengagement between the spring and the member upon which it is wound.

Figure 7 shows another embodiment which utilizes our novel disengageable clutch spring wherein a conventional spring clutch is utilized for drivingly connecting a first and second member for rotation in the first direction and the spring clutch of our novel invention is utilized for forming a driving connection in a reverse direction which is disengageable.

Figure 8 is a cross-sectional view of the clutch shown in Figure 7 and taken along the lines A—A when the clutch is rotated in the direction shown.

Figure 9 is a view similar to Figure 8 wherein the direction of rotation has been reversed and a novel disengageable spring has been moved to its disengaged position by the engaging means.

Referring now to Figure 1, it is clearly seen that a first member 20 may be drivingly connected to the second member 21 by means of the spring 22. A portion of the spring 22 may be force fitted upon the second member 21 to thereby normally provide a driving connection between the spring and the member for two directions of rotation.

The end 23 of the portion of the spring 22 which is wound on the second member 21 is then constructed to protrude from the periphery of the spring coils in the manner shown in Figure 1. The other end 24 of the spring 22 is then drivingly connected to the first member 20 by a connection which could be formed by a screw 25. Obviously, this connection could be made in any desired manner such as continuing the spring 22 and providing a force fit between the spring and the member 20 and the fastening shown as screw 25 is for illustrative purposes only.

An engaging means is shown generally at 26 and is constructed to provide a ratchet type of action between the engaging means and the protruding end 23 of the spring 22. This engaging means is more specifically comprised of a fixed pivot 27, a ratchet element 28 and a spring 29. Clockwise rotation of the ratchet element 28 about the fixed pivot 27 is prevented by means of the fixed member 30 which protrudes to engage the ratchet member 28. The spring 29 serves to bias the ratchet element 28 about its pivot 27 in a clockwise direction and is connected between the connecting members 31 and 32 where the connecting member 31 is attached to a rigid member 33.

Operation of the spring clutch shown in Figure 1 may be clearly understood with reference to Figures 2 and 3. More specifically, Figure 2 shows the rotation of members 20 and 21 which are now drivingly connected by means of the spring 22. Clearly, this clockwise rotation will cause the end portion 23 of the spring 22 to come into engagement with the ratchet element 28 as is shown in the dotted view of Figure 2.

Continued rotation of the members 20 and 21 will then force the spring end 23 to rotate the ratchet member 28 about its pivot point 27 and as is shown in the solid line view of Figure 2 to cause subsequent disengagement between ratchet member 28 and the spring 23.

Hence, it is seen that during clockwise rotation, the engagement between the engaging means 26 and the protruding end 23 of the spring 22 will merely tend to wind the spring 22 in its wound direction and will not affect the driving connection between the first and second members 20 and 21, respectively.

If it is now desired to reverse the rotation of the members 20 and 21 and still maintain a driving connection between these members for at least a portion of this rotation, then, as is shown in Figure 3, the driving connection will exist until the end portion 23 of the spring 22 engages the ratchet member 28. Clearly, this direction of rotation, as shown by the arrow in Figure 3, brings the spring end 23 and 28 into engagement but rotation of the member 28 about its pivot point 27 is prevented by means of the rigid member or latch 30.

In view of this engagement between the spring and engaging means, continued rotation will tend to wind the spring in a direction opposite to its wound direction to thereby increase the inner diameter of spring 22 to the position shown in Figure 3 thereby defeating the driving connection between the spring 22 and the member 21 upon which it is wound.

Figure 4 shows a modification of our novel clutch shown in Figure 3 whereby the spring 22 is now shown as being wound on the member 34 which could be a driving shaft as well as the member 35 which could be the driven shaft, the end portion of the spring 22 being fastened by means of a force fit. Here, however, the engaging means shown generally at 36 and 37 is so constructed as to allow disengagement of the driving connection between members 34 and 35 which are normally drivingly connected in view of the force fit of these members within the spring 22 upon rotation in either direction.

The disengaging means 36 and 37 are identical and could comprise an engaging member 38 which is slidably movable on the pin 39 in such a manner as to be movable into and out of engagement with the end portion 23 of the spring 22. Similarly, the engaging means shown generally at 37 is slidably movable into and out of engagement with the second end portion 40 of the spring 22. Hence, for counter-clockwise rotation of the driving member 34 of Figure 4 with the member 38 of the engaging means 36 being withdrawn as is shown in Figure 5, the force fit of the spring 22 on the members 34 and 35 will be sufficient to maintain these members in driving relationship.

When, however, the member 38 of the engaging means 36 is slid into a position to engage the end portion 23 of spring 22, as is shown in Figure 6, a continued rotation of the driving shaft 34 will cause the spring 22 to be driven in its unwound position to thereby effect a release of the driving connection between the spring 22 and at least the driven shaft 35.

Clearly, the driving shaft 34 is drivingly connected to the driven shaft 35 upon clockwise rotation of the driving shaft 34 and release of this driving connection may be effected in the exact same manner as was described for counterclockwise rotation by means of the engaging means 37 which will act in the exact same manner as did the engaging means 36.

If so desired, the two disengaging means 36 and 37 can be tied together mechanically and then combined movement can be governed by the direction of rotation of member 34. When member 34 is rotating clockwise, only blocking means 37 can be moved into engagement with 40. And similarly, when member 34 is rotating counter-clockwise, only blocking means 36 can be moved into engagement with 23.

Figure 7 shows a further embodiment of our novel clutch principle wherein a driving member 41 is drivingly connected to a driven member 42 by means of the conventional spring clutch member 43 and a clutch member 44 which is constructed in accordance with our novel principles. The driving member 41 is more specifically driven by means of a motor 45 which drives a gear 46 through a gear box 47. The gear 46 engages the member 41 which is machined to have gear teeth 48 which will cooperate with the gear 46 and the driving member 41 is mounted within a fixed housing, a portion of which is shown at 49 by means of the ball bearings indicated at 50.

The driven member 42 is similarly mounted in a fixed housing, a portion of which is shown at 51 and is connected thereto by means of the bearings 52. The driving member 41 and the driven member 42 are further provided with a bushing 53 which is inserted under the lip 54 of driving member 41. Clearly, the output of the driven member 42 could, if desired, be a device which is operatively attached to the gear 55 which is fastened to the driven member 42.

In view of this type of construction, it is clear that rotation of the drive shaft 41 in a direction that would advance a right hand screw to the right of the figure would be transmitted to the driven member 42 by means of the spring clutch member 43 which is force fitted within the driven member 42 and the driving member 41, if desired, could be fastened to the spring member 43 by means of the weld 57.

A second spring member 44 which is constructed in accordance with our novel invention is then drivingly connected to the driving member 41 by means of a forced fit, one end of the spring being fastened to the protrusion 59 of the driven member 42 by any desired means as by the weld 60 and the other end 61 of the spring 58 being constructed to protrude beyond the periphery of the spring.

An engaging means shown generally at 62 is then provided and comprises the ratchet element 63 which is pivotally mounted about the pivot point 64 which is fixed within the fixed member 65. A biasing spring 66 is then provided whereby the ratchet element 63 is maintained in a position to engage the spring end 61 upon rotation thereof.

Operation of this system is clearly shown in Figure 8 which is a cross-sectional view of Figure 7 and taken along the line indicated by the arrows A—A whereby rotation of the driving member 41 is, as indicated by the arrow, in a clockwise direction. Rotation in this direction will, as is shown in Figure 8, tend to expand the outer diameter of the spring 43 to thereby maintain a driving engagement between the driving member 41 and the driven member 42. Clearly, as the protruding end 61 of the spring 44 is brought into engagement with the engaging means 62, the spring, as is shown in the dotted lines of Figure 8, will flex and the ratchet element 63 will rotate in a counterclockwise direction about its pivot point 64 to thereby release the spring end 61 upon continued rotation of the driving member 41.

If, however, the direction of rotation of the driving shaft 41 is reversed and it is desired to maintain the driving engagement between the driving member 41 and the driven member 42 for at least a portion of the reverse rotation of the driving member 41, then it is seen in Figure 9 that although the spring 43 is rotated in its unwound direction to thereby contract for the internal disengagement between members 41 and 42, the spring 44 will maintain the driving engagement until the spring end 61 engages the ratchet member 63 to cause unwinding of the spring 44 and the subsequent complete disengagement between the driving member 41 and the driven member 42.

Although we have described preferred embodiments of our invention, it will now be apparent that many variations and modifications may be made by those skilled in the art and we prefer to be limited, therefore, not by the specific disclosure herein but only by the appending claims.

We claim:

1. A disengageable spring clutch for providing a driving connection between a first and second rotatable member; said first and second rotatable members being coaxially positioned and having hollow portions extending from their adjacent ends; said clutch comprising a first and second spring; at least a portion of said first spring being positioned within said hollow portions of said first and second rotatable members; said first spring having an end portion thereof fastened to said first rotatable member; said first spring being wound to contract when said first member is rotated in a direction to force said first spring to tend to expand; at least a portion of said second spring being wound on said first member to provide a driving connection between said first member and said second spring for any rotation of said first member; the end of said wound portion being constructed to protrude from the periphery of said wound portion of said second spring; the other end of said second spring being drivingly connected to said second member; and means constructed to be engageable with said protruding end of said second spring upon rotation of said first member; said means being biased into the path defined by said protruding member as said first member is rotated; said biased means engaging and unwinding said second spring when said first member is rotated in a direction to cause said first spring to contract.

2. A disengageable spring clutch for providing a driving connection between a first and second rotatable member; said first and second rotatable members being coaxially positioned and having hollow portions extending from their adjacent ends; said clutch comprising a first and second spring; at least a portion of said first spring being positioned within said hollow portions of said first and second rotatable members; said first spring having an end portion thereof fastened to said second rotatable member; said first spring being wound to contract when said first member is rotated in a direction to force said first spring to tend to expand; at least a portion of said second spring being wound on said first member to provide a driving connection between said first member and said second spring for any rotation of said first member; the end of said wound portion being constructed to protrude from the periphery of said wound portion of said second spring; the other end of said second spring being drivingly connected to said second member; and means constricted to be engageable with said protruding end of said second spring upon rotation of said first member; said means being biased into the path defined by said protruding member as said first member is rotated; said biased means engaging and unwinding said second spring when said first member is rotated in a direction to cause said first spring to contract.

References Cited in the file of this patent

UNITED STATES PATENTS

| | | |
|---|---|---|
| 1,001,303 | Reeves | Aug. 22, 1911 |
| 1,629,420 | Starkey | May 17, 1927 |
| 1,674,009 | Holmes | June 19, 1928 |
| 2,098,021 | Wheeler | Nov. 2, 1937 |
| 2,475,432 | Marihart | July 5, 1949 |
| 2,723,013 | Rogers et al. | Nov. 8, 1955 |
| 2,738,863 | Stelljes | Mar. 20, 1956 |

FOREIGN PATENTS

| | | |
|---|---|---|
| 829,976 | Germany | Jan. 31, 1952 |